Nov. 6, 1945.　　　H. R. BAGLEY　　　2,388,460
CONTROL MECHANISM FOR FLUID OPERATED PARTS OF MACHINE TOOLS
Filed Nov. 27, 1943　　　3 Sheets-Sheet 1

Inventor
H. R. Bagley
By Glascock Downing Seebold
Attys.

Patented Nov. 6, 1945

2,388,460

UNITED STATES PATENT OFFICE 2,388,460

CONTROL MECHANISM FOR FLUID OPERATED PARTS OF MACHINE TOOLS

Harold Richard Bagley, Tile Hill, Coventry, England, assignor to A. C. Wickman Limited, Coventry, England Application November 27, 1943, Serial No. 512,012
In Great Britain December 17, 1942

2 Claims. (Cl. 60—97)

This invention relates to control mechanism for fluid operated parts of machine tools, in which the carrying out of an operation or a number of operations on a work piece involves relative movements of different parts of the machine in a predetermined sequence or cycle. The object of the invention is to provide a convenient control mechanism enabling the attendant to cause independent movements of any part of the machine involved in the cycle, or to cause all the parts so involved to move in the desired sequence.

The invention comprises control mechanism for fluid operable parts of a machine tool, having in combination a plurality of valves each adapted to effect complete control of an individual operation of the machine in response to an attendant and part control of the said operation in response to a movement of the machine, and a master valve adapted to initiate automatic action of all of the other valves in response to actuation by the attendant and to be restored to its initial position in response to a movement of the machine at an appropriate interval in the work cycle.

In particular the invention comprises the combination of (a) one or more valves movable in both of two directions in response to the attendant, in one of such directions in response to fluid pressure, and in the other direction in response to a movable part of the machine, (b) a valve movable in both of two directions in response to the attendant, and in one of such directions in response to a movable part of the machine, and (c) a master valve movable in one of two directions in response to the attendant and in the other direction in response to fluid pressure.

In the accompanying sheets of explanatory drawings.

Figure 1:
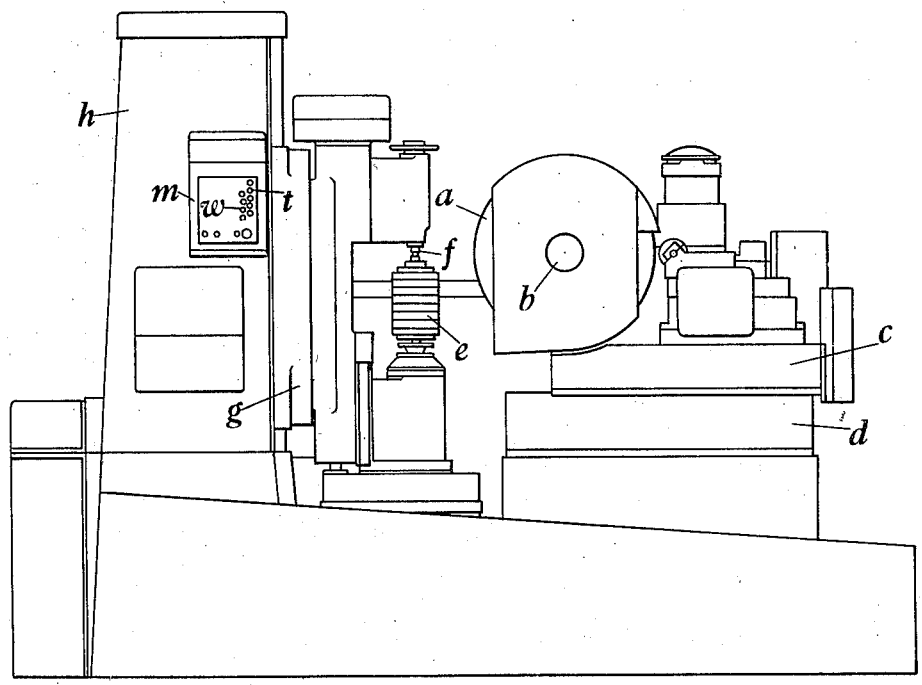
Figure 1 is a front elevation of a machine which is adapted to grind the teeth of gear wheels, and to which the invention is applicable.

The machine shown in Figure 1 is provided with a rotary grinding wheel $a$ having a helically shaped abrasive peripheral surface. The wheel $a$ is carried by a spindle $b$ on a slide $c$ which is movable on a horizontal bed $d$ in a direction at right angles to the axis of the spindle both to and from the work piece $e$. The workpiece $e$ is carried on a rotary spindle $f$ which is either vertical or inclined to the vertical, and is carried by a slide $g$ movable upwardly and downwardly on a vertical column $h$. Movement of the wheel-spindle slide $c$ is effected by hydraulic pressure. Movement of the work-spindle slide $g$ is effected by a screw and nut mechanism which is actuated by an electric motor or any other source of motion through an hydraulically operated clutch. Rotation of the work spindle $f$ is effected through gearing from the same electric motor or any other source of motion through another hydraulically operated clutch. The above described means for actuating the slides $c$, $g$ are well known and form no part of the present invention. It is desired to enable the attendant to cause either independent movements of the two slides $c$, $g$ and the work spindle $f$, or to cause these parts to move automatically through a predetermined cycle. Such a cycle may consist of for example the following movements: (1) setting the work spindle $f$ in motion, (2) advancing the grinding wheel $a$ into engagement with the work piece $e$, (3) moving the work spindle slide $g$ in the upward direction relatively to the grinding wheel, (4) retracting the grinding wheel to its initial position, (5) returning the work spindle slide to its initial position and (6) stopping the work spindle.

Figure 2:
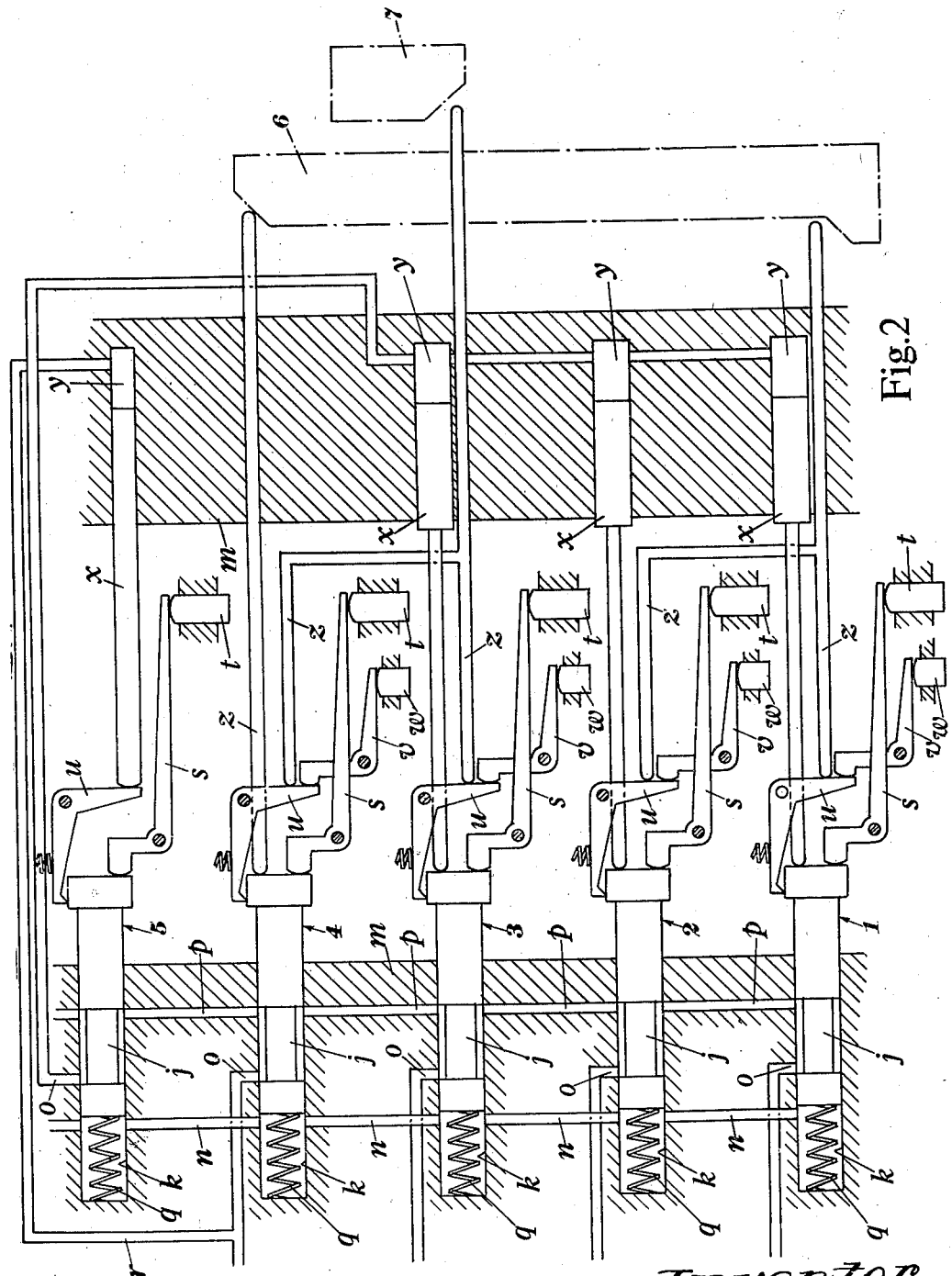
Figure 2 is a diagram illustrating control mechanism in accordance with the invention.

The control mechanism illustrated diagrammatically in Figure 2 is suitable for the machine shown in Figure 1. In constructing this control mechanism, I employ five valves which are indicated by 1, 2, 3, 4, and 5, respectively. Each of these valves consists of a piston $j$ slidable in a bore $k$ in a housing $m$ which may accommodate all the valves. Each bore $k$ communicates with three passages $n$, $o$, $p$, and each piston $j$ is such that it can connect the associated passage $o$ to either of the corresponding passages $n$, $p$. A spring $q$ or fluid pressure acting on one end of each piston $j$ serves to move the latter to the position in which it interconnects the associated passages $o$, $p$. The passages $n$, $p$ serve respectively to connect the bores $k$ to a source of pressure-liquid and a liquid sump. The passages $o$ associated with valves 1 to 3 serve to connect the corresponding bores $k$ to components of the machine to be actuated by fluid pressure. The passage $o$ associated with the valve 4 serves to connect the corresponding bore $k$ to another fluid-operable component of the machine and also to another passage $r$ leading to a fluid-operable component of the control mechanism being described. The passage $o$ associated with the valve 5 serves to connect the corresponding bore $k$ to other fluid-operable components of the control mechanism being described.

In association with the outer ends of each of the valves 1 to 3 are arranged the following actuating and controlling means: (1) a lever $s$ operable by a push button $t$ for moving the piston $j$ against the spring $q$ or fluid pressure to the position in which it interconnects the associated passages $n$, $o$, (2) a spring-loaded catch $u$ for holding the piston in this position, (3) a lever $v$ operable by a push button $w$ for releasing the catch and thereby allowing the valve to return under the action of its spring, (4) a hydraulically operated plunger $x$ contained in a bore $y$ in the housing $m$, and (5) a push rod $z$ operable by one of a pair of tappets 6, 7 on the vertical slide $g$ of the machine, the push rods associated with valves 1 and 2 being operable by the tappet 6, and the push rod associated with the valve 3 being operable by the tappet 7.

In association with the valve 4, I provide actuating and controlling means similar to and indicated by the same reference characters as those above enumerated 1, 2, 3, and 5 the last (of which two are employed) being actuated respectively by the tappets 6, 7 on the vertical slide $g$, and in association with valve 5 (which is a master valve) I provide actuating and controlling means similar to and indicated by the same reference characters as those above enumerated 1, 2, and 4.

The hydraulic plungers $x$ associated with the valves 1 to 3 serve to move the corresponding pistons $j$ against the action of their loading springs $q$ or fluid pressure to the positions in which they interconnect the associated passages $n$, $o$, and the hydraulic plunger $x$ associated with the master valve 5 serves to release the corresponding catch $u$. The push rods $z$ associated with valves 1 to 3 serve to release the corresponding catches $u$, and the two push rods $z$ associated with the valve 4 serve respectively to release the corresponding catch $u$ and to move the corresponding piston $j$ against its spring $q$ or fluid pressure to the position in which it interconnects the associated passages $n$, $o$.

By means of the above described control mechanism, the attendant is able to stop and start movement of either of the slides $c$, $g$ or of the work spindle $f$ by actuation of the appropriate push buttons $t$, $w$ associated with valves 1 to 4. The valve 1 controls the upward movement of the vertical slide $g$ and the valve 4 controls the downward movement of this slide. The valve 2 controls the movements of the horizontal slide $c$, and the valve 3 controls the rotation of the work spindle $f$. The valves 1 to 4 enable independent movements of the parts mentioned to be obtained under push-button control. The valves 1 to 4 are also so co-ordinated that actuation of the single push button $t$ of the master valve 5 causes the machine to perform a cycle of movements automatically.

The automatic actuation of the valves 1 to 4 in response to movement of the push button $t$ of the master valve 5 is obtained in the following manner: On pressing this button $t$ the piston $j$ of the valve 5 is moved to the position in which it connects the pressure-fluid passage $n$ with the passage $o$ which leads to the bores $y$ containing the plungers $x$ for actuating the valves 1 to 3. This causes the pistons $j$ of these valves to be moved to the positions in which pressure fluid is admitted to the machine components which set in motion the two slides $c$, $g$ and the work spindle $f$. Assuming that the operative movement of the vertical slide $g$ is in the upward direction, the work piece $e$ is during this movement subjected to the action of the grinding wheel $a$. When this slide approaches the upper limit of its movement, the tappet 6 on the slide actuates the push rod $z$ associated with the valve 4, thereby causing this valve to admit pressure-fluid to the clutch which reverses the movement of the slide. But reversal does not actually occur until the valve 1 associated with the same clutch is opened to exhaust. At the same time the valve 4 admits pressure fluid to the bore $y$ of the plunger $x$ of the master valve 5, so causing this valve to be released, and returned to its initial position. A small further upward movement of the vertical slide $g$ acting through tappet 6 releases the valve 1 and so allows the vertical slide to commence its downward travel. Simultaneously with the actuation of the valve 1 the tappet 6 on the slide $g$ releases the valve 2 and so allows the horizontal slide $c$ to return under the action of fluid pressure, thereby carrying the grinding wheel $a$ clear of the work piece $e$. When the vertical slide $g$ approaches the end of its downward travel the other tappet 7 on this slide releases the valve 3 and so brings the work spindle $f$ to rest. This tappet also releases the valve 4, so bringing the vertical slide $g$ to rest at its initial position, the cycle being thereby completed. To repeat the cycle the attendant merely presses again the single push button $t$ of the master valve 5.

By this invention the control of either independent or cyclic movements of the main parts of the machine above described is obtained in a very simple and convenient manner, the control mechanism being such that it can be arranged compactly on any convenient part of the machine, for example, the column $h$ carrying the vertical slide $g$ as shown in Figure 1.

Figure 3:
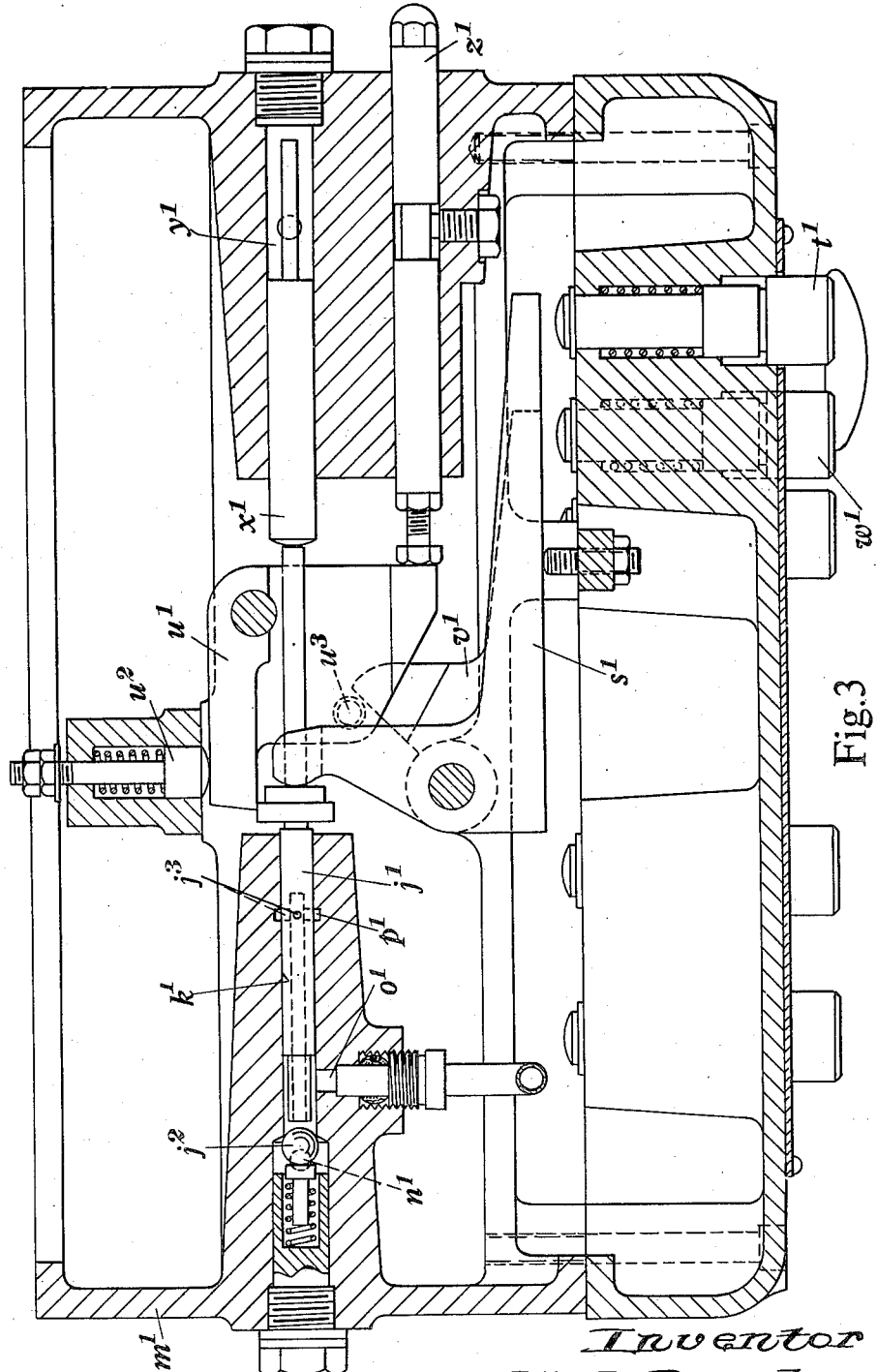
Figure 3 is a sectional plan of control mechanism constructed in accordance with the invention.

A preferred form of some of the parts illustrated diagrammatically in Figure 2 is shown in Figure 3 which is a sectional plan showing one of the valves 1 to 3 and the associated parts. As shown in Figure 3 the valve comprises in combination a hollow stem $j^1$ slidable in a bore $k^1$ in a housing $m^1$, and a spring-loaded ball $j^2$ arranged on a seating in the bore adjacent to one end of the stem, the end of the stem adjacent to the ball being open and reduced, and the other or outer end of the stem being closed. In communication with the bore $k^1$ is a passage $n^1$ leading to a source of pressure-liquid, a second passage $o^1$ leading to the component of the machine to be actuated by fluid pressure, and a third passage $p^1$ leading to a liquid sump. When the stem $j^1$ is in its normal position as shown, the passages $o^1$, $p^1$ communicate with each other through the interior of the stem $j^1$ and the radial holes $j^3$ in the stem. Also the ball $j^2$ serves to prevent communication between the passages $n^1$, $o^1$ which are situated at opposite sides of the ball seating. Inward movement of the stem $j^1$ interrupts communication between the passages $o^1$, $p^1$, and moves the ball $j^2$ off its seating to establish communication between the passages $n^1$, $o^1$. This movement of the stem $j^1$ can be effected either by a push button $t^1$ which is adapted to act on the stem through the medium of a lever $s^1$, or automatically by a hydraulically operated plunger $x^1$ arranged in a bore $y^1$ in the housing $m^1$. Pivoted in the housing $m^1$ is a catch $u^1$ which, when the stem $j^1$ has been moved as above described, engages the adjacent end of the stem under the action of a spring-loaded plunger $u^2$ and holds the stem against return movement until the catch is released. Release of the catch $u^1$ can be effected either by a push button $w^1$ or by a push rod $z^1$ the push button being adapted to act on the catch through the medium of a lever $v^1$ and an abutment $u^3$ on the catch, and the push rod being arranged to act on the catch under the action of a tappet as previously described.

Whilst primarily intended for a grinding machine of the kind described, the invention is not limited thereto as it may be applied to other machine tools; also the number of valves provided may be varied to suit different requirements. Further the invention is not limited to the mechanical details specified as these may be varied without departing from the essential features of the invention. Thus for example instead of push buttons small levers may be used for enabling the attendant to actuate the valves, and instead of piston valves any other convenient valves may be used.

Having thus described my invention what I claim as new and desire to secure by Letters Patent is:

1. Control mechanism for fluid operated parts of a machine tool, having in combination a plurality of valves each adapted to control an individual operation of the machine, a master valve adapted to initiate automatic action of all of the other valves, members operable by an attendant for individually moving the valves in one direction against the action of spring or fluid pressure, catches for individually holding the valves in the positions to which they are movable by the said members, additional members operable by the attendant for releasing the catches associated with, and thereby allowing return movements, of all of the valves with the exception of the master valve, hydraulic means controlled by the master valve for moving at least one of the other valves in the first mentioned direction, a push rod responsive to a movable part of the machine for moving another of the valves in the first mentioned direction, hydraulic means for releasing the catch associated with, and thereby allowing return movement of the master valve, under the control of the valve operable by the push rod, and additional push rods responsive to a movable part of the machine for releasing the catches associated with, and thereby allowing return movement of, all of the valves with the exception of the master valve.

2. A control mechanism for fluid operated parts of a machine tool, having in combination a plurality of valves each adapted to control an individual operation of the machine, a master valve adapted to initiate automatic action of all of the other valves, push buttons operable by an attendant for individually moving the valves in one direction against the action of spring or fluid pressure, transmission levers arranged between the push buttons and valves, catches for individually holding the valves in the positions to which they are movable by the push buttons, additional push buttons operable by the attendant for releasing the catches associated with, and thereby allowing return movements, of all of the valves with the exception of the master valve, transmission levers arranged between the additional push buttons and the associated catches, hydraulic means controlled by the master valve for moving at least one of the other valves in the first mentioned direction, a push rod responsive to a movable part of the machine for moving another of the valves in the first mentioned direction, hydraulic means for releasing the catch associated with, and thereby allowing return movement of, the master valve under the control of the valve operable by the push rod, and additional push rods responsive to a movable part of the machine for releasing the catches associated with, and thereby allowing return movement of, all of the valves with the exception of the master valve.

HAROLD RICHARD BAGLEY.